United States Patent [19]

Acker

[11] Patent Number: 5,501,027
[45] Date of Patent: Mar. 26, 1996

[54] FISHING POLE ALERT DEVICE

[76] Inventor: Jody L. Acker, #8, 287 Hudson St., Cornwall On Hudson, N.Y. 12520

[21] Appl. No.: 330,816

[22] Filed: Oct. 24, 1994

[51] Int. Cl.⁶ .................................................. A01K 85/01
[52] U.S. Cl. ............................................. 43/17; 43/21.2
[58] Field of Search ............................ 43/21.2, 17, 16

[56] References Cited

U.S. PATENT DOCUMENTS

| | | | |
|---|---|---|---|
| 2,785,494 | 3/1957 | Eaton | 43/17 |
| 3,264,773 | 8/1966 | Woznick | 43/17 |
| 3,516,190 | 6/1970 | Cook. | |
| 3,559,327 | 2/1971 | Christopher. | |
| 3,835,568 | 9/1974 | Whitfield | 43/17 |
| 3,959,911 | 6/1976 | Puckett | 43/17 |
| 4,214,394 | 7/1980 | Shogan. | |
| 4,236,339 | 12/1980 | White. | |
| 4,611,427 | 9/1986 | Coutcher. | |
| 5,063,373 | 11/1991 | Lindsley. | |
| 5,129,174 | 7/1992 | Wilson. | |
| 5,185,949 | 2/1993 | Patterson. | |
| 5,355,610 | 10/1994 | Sizemore et al. | 43/21.2 |

FOREIGN PATENT DOCUMENTS

| | | | |
|---|---|---|---|
| 2639352 | 3/1978 | Germany | 43/21.2 |
| 2021911 | 12/1979 | United Kingdom | 43/17 |
| 2170081 | 7/1986 | United Kingdom. | |
| 2227635 | 8/1990 | United Kingdom | 43/21.2 |

Primary Examiner—Richard K. Seidel
Assistant Examiner—James Miner
Attorney, Agent, or Firm—Richard C. Litman

[57] ABSTRACT

A fishing rod alert device having an alarm signal generator, and a telescoping stake to anchor the device to the ground. The alarm signal generator has a trip bar that supports the rod near its tip. The trip bar is pivoted and spring biased. When a fish strikes the lure the trip bar is caused to pivot. After the strike the trip bar rebounds and impinges on a switch to activate the alarm signal generator, thus producing an audible and/or visual alarm signal. The sensitivity of the alarm signal generator can be adjusted by moving the pivot point of the trip bar relative to the switch.

11 Claims, 3 Drawing Sheets

FISHING POLE ALERT DEVICE

BACKGROUND OF THE INVENTION

1. Field of the Invention

The present invention relates to a fishing rod or pole alert device that alerts the fisherman through an audible signal when a fish has been caught on the fishing line.

2. Description of the Prior Art

It is common practice, when fishing with a rod and reel, to bait the hook, cast the baited hook into a body of water, and then wait until a fish takes the baited hook. The fisherman often has to wait for long periods between the time he or she makes the cast and the time a fish strikes the bait. During this long period of waiting, the fisherman has to maintain a constant watch over his or her rod and reel so that he or she can take appropriate action immediately in response to a fish striking the bait or lure. Immediate response to a fish striking the lure is necessary if the fisherman is to "set" the hook before the fish escapes. Maintaining a watchful eye on the rod and reel for long periods of time is a very tedious and boring task and often times the fisherman may fall asleep, or he or she may direct attention to other activities and leave the rod unattended.

For the aforesaid reasons many devices have been proposed in the prior art both to hold the rod so as to leave the fisherman's hands free, and to automatically alert the fisherman once a fish strikes the bait.

U.S. Pat. No. 3,516,190, issued to Cook, shows a fishing rod holder that requires a square insert to fix the rod to the holder. Cook does not teach or suggest an alert device incorporated into the holder.

U.S. Pat. No. 3,559,327, issued to Christopher, shows a fishing rod rest that also has an alarm device that sounds an alarm in response to a fish striking the bait. Christopher uses a lever hooked to the fishing line to detect the fish striking the bait. Christopher does not teach or suggest the structure of the present invention which uses the movement of a trip bar which supports the rod to trigger an alarm.

U.S. Pat. No. 4,214,394, issued to Shogan, shows an alarm for indicating the pull of a fish on a fishing line, which mounts to the fishing rod. Shogan does not show a fishing rod holder. Shogan uses a spring biased plunger that completes a circuit to activate an alarm, when the fishing line is pulled out from between the plunger and the circuit contacts by a fish.

U.S. Pat. No. 4,236,339, issued to White, shows a fishing rod holder and alarm combination which uses a spring biased U-shaped member around the fishing rod handle to maintain the rod in place. When a fish pulls on the line, the rod tip is pulled down causing the rod to pivot about its midpoint, thus raising the rod handle. The raising of the handle also raises the U-shaped member causing the closing of an electrical contact which generates an alarm. The White patent does not teach or suggest the arrangement of the trip bar and alarm button of the present invention. Further, The white patent does not show a means for adjusting the sensitivity of the fishing rod alarm to compensate for the roughness of the body of water in which the fishing activity is taking place.

U.S. Pat. No. 4,611,427, issued to Coutcher, shows a collapsible fishing rod holder. Coutcher does not disclose an alarm incorporated into the rod holder as in the present invention.

U.S. Pat. No. 5,063,373, issued to Lindsley, shows an alarm which is positioned so that a fishing rod impinges on the contact switch. When a fish pulls on the line the rod is bent, closing the switch, and causing an alarm to sound. The Lindsley patent does not teach or suggest the arrangement of the trip bar and alarm button of the present invention.

U.S. Pat. No. 5,129,174, issued to Wilson, shows a mechanical bite indicator. The Wilson device comprises a line holder and a spring biased illuminated member. When a fish strikes, the line is released which also releases the illuminated member. The change in position of the illuminated member indicates that a fish has taken the bait. The Wilson patent does not teach or suggest the arrangement of the trip bar and alarm button of the present invention.

U.S. Pat. No. 5,185,949, issued to Patterson, shows a rod holder fixed to a spring biased pivoting member. When a fish pulls on the line, the pivoting member closes a switch to generate an alarm. The Patterson patent does not teach or suggest the arrangement of the trip bar and alarm button of the present invention. Further the Patterson patent does not teach or suggest slidably moving the pivot point of the trip bar to change the sensitivity of the alarm device as in the present invention.

United Kingdom patent application 2,170,081, by Reid, shows a translucent fishing rod that is illuminated along its length by a battery operated light source housed in its handle. When a fish bites, the movement of the illuminated rod can be seen, and indicates a fish striking the lure. Reid does not disclose the telescoping rod holder or the pivoted trip bar of the present invention.

None of the above inventions and patents, taken either singly or in combination, is seen to describe the instant invention as claimed.

SUMMARY OF THE INVENTION

The present invention is a fishing rod holder having an integral alarm device. The alarm device is supported by a telescoping stake. The alarm device comprises a trip bar that supports the rod near its tip. The trip bar is pivoted and spring biased. When a fish strikes, the lure the trip bar is caused to pivot. After the strike the trip bar rebounds and impinges on an alarm button to activate an audible alarm. The sensitivity of the alarm device is adjusted by moving the pivot point of the trip bar relative to the alarm button.

Accordingly, it is a principal object of the invention to provide a fishing rod support having an integral alert device which can both support the fishing rod and alert the fisherman in the event of a fish striking the lure.

It is another object of the invention to provide a fishing rod support having an integral alert device, the sensitivity of which can be adjusted to compensate for the roughness of the water in which the fishing activity is carried out.

It is a further object of the invention to provide a fishing rod support having an integral alert device which is portable.

Still another object of the invention is to provide a fishing rod support having an integral alert device which is compact and can be carried on a person's belt, thus leaving the person's hands free to transport other equipment.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
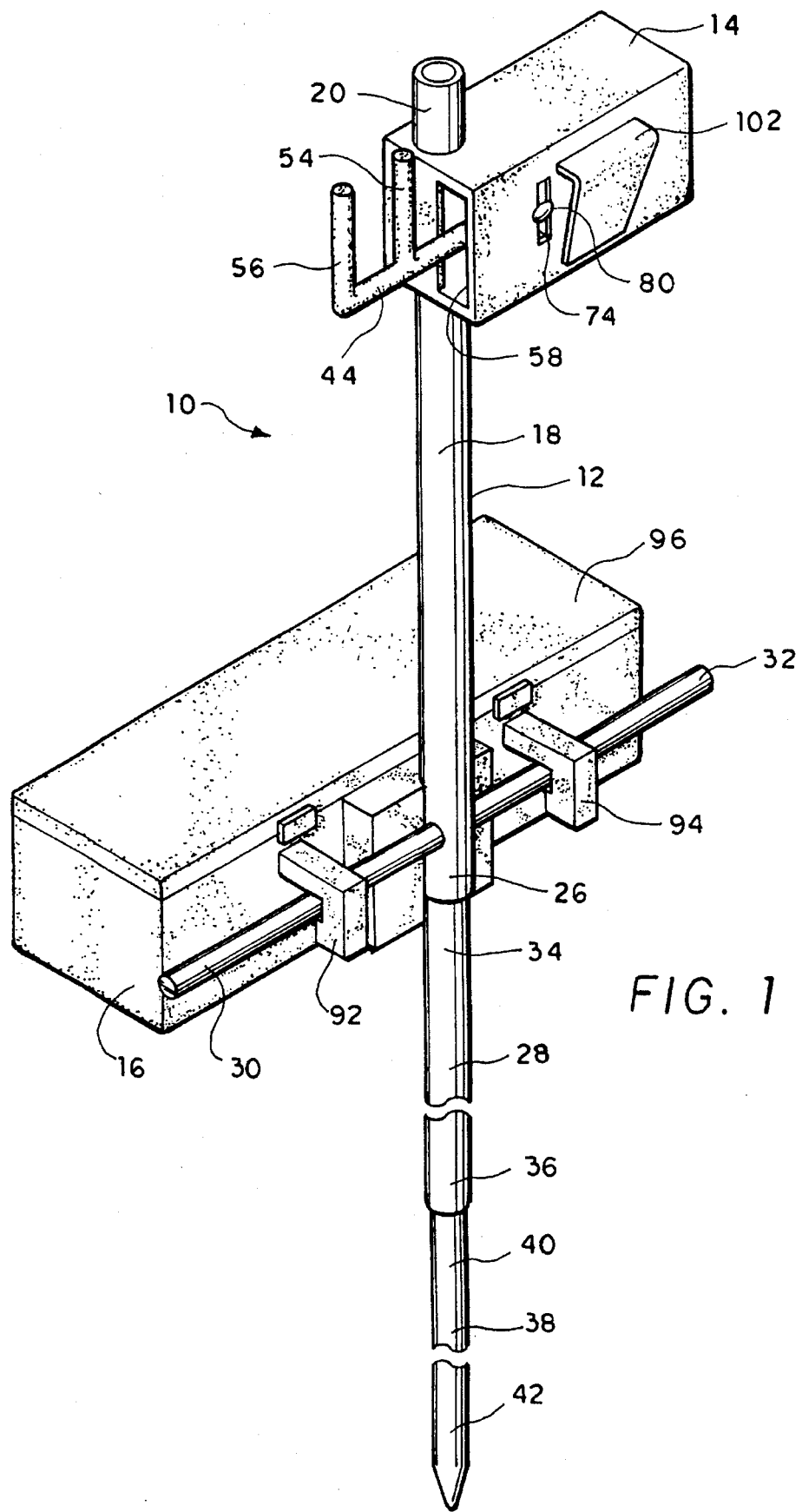
FIG. 1 is a perspective view of the fishing rod holder of the present invention showing the telescoping stake extended.
Figure 2:
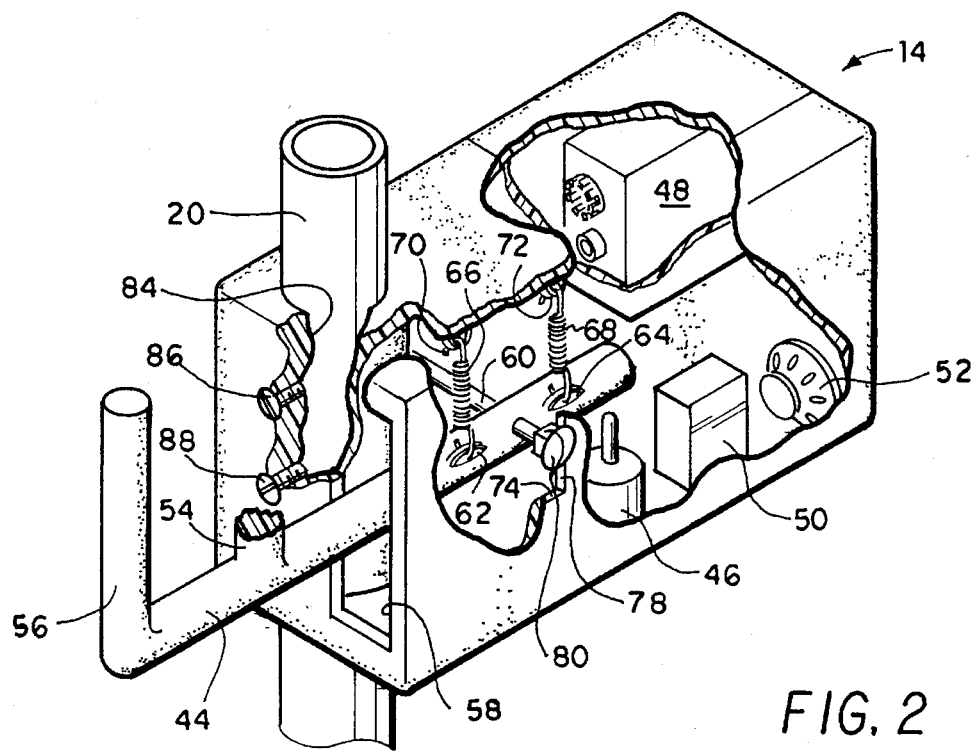
FIG. 2 is a perspective view of the alert box partially broken away to reveal internal detail.
Figure 4:
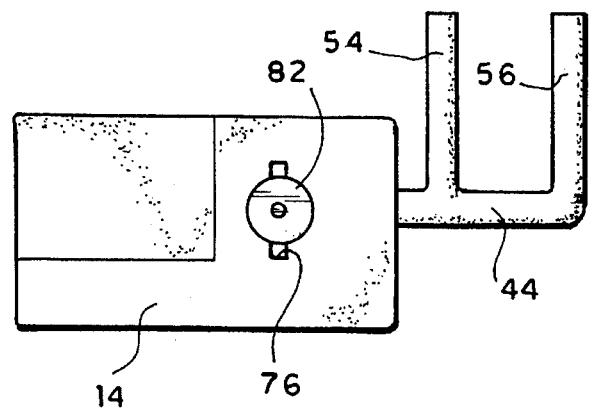
FIG. 4 is right side elevational view of the alert box showing the sensitivity adjustment knob.
Figure 3:
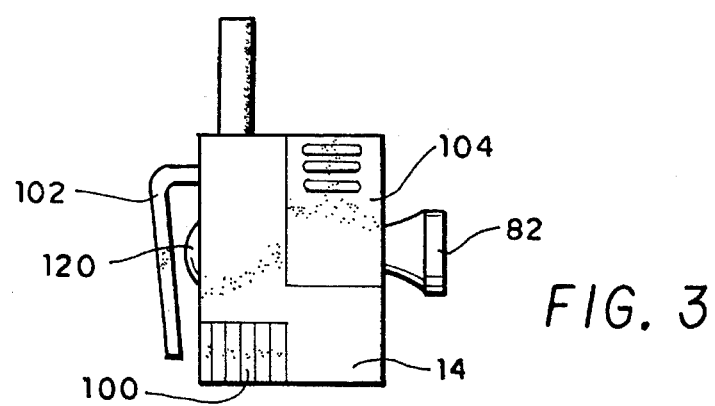
FIG. 3 is a rear elevational view of the alert box showing a speaker grille.

Refering to FIGS. 1–4, the present invention 10 is a fishing rod holder having an integral alert device comprising a collapsible stake 12, an alert box 14, and a tackle box 16.

The stake 12 is preferably of the telescoping kind, however other mechanisms such as hinged joints that allow the stake 12 to fold up can also be used. The stake 12 as shown comprises three pieces that telescope within each other to transform the stake 12 between an extended configuration and a collapsed configuration.

The top piece 18 has a first end 20 which has through holes for fixing the alert box 14 to the stake 12. The second end 26 is telescopically engaged to the middle piece 28. Proximate the second end 26 are handles 30 and 32. The handles 30 and 32 can be used to drive the stake 12 into the ground when it is in the extended configuration. The middle piece 28 has first and second ends 34 and 36 respectively. The first end of the middle piece 34 is telescopically engaged to the second end of the top piece 26, and the second end of the middle piece 36 is telescopically engaged to the bottom piece 38. The bottom piece 38 has a first end 40 which is telescopically engaged to the second end of the middle piece 36, and a second end 42 which is in a frustoconical shape with a rounded tip to facilitate the penetration of the stake into the ground.

The stake 12 also includes a mechanism for maintaining the stake in either the extended or collapsed configuration. For example spring loaded catches may be provided at the second end of the top piece 26 and the second end of the middle piece 36, which engage one of a plurality of recesses provided along the length of the middle piece 28 and the bottom piece 38 respectively. Such mechanisms are well known and are commonly used, for example, in the telescoping legs of camera tripods, therefore the mechanism for maintaining the stake in either the extended or collapsed configuration is not shown in the drawings.

The alert box 14 houses a trip bar 44, an alert button 46, a battery 48, a music box 50, and a speaker 52. The alert box 14 is fixed to the first end of the top piece 20. The manner in which the alert box is fixed to the stake 12 will be discussed below.

The trip bar 44 has an outside portion, so called because it lies outside the alert box, and an inside portion, so called because it lies inside the alert box. Two upward projections 54 and 56 project from the outside portion of the trip bar 44.

The trip bar 44 projects from the alert box 14 through the rectangular slot 58 provided in the front of the box. The inside portion of the trip bar 44 has a through hole to allow the passage of the shaft 60 about which the trip bar 44 can pivot.

Disposed symmetrically on either side of the through hole for the shaft 60 are eyes 62 and 64. The eyes 62 and 64 are engaged by the first ends of identical springs 66 and 68 respectively. The second ends of springs 66 and 68 are attached to couplings 70 and 72, provided on the top internal surface of the alert box 14, respectively. The springs 66 and 68 are in tension at all times and counterbalance each other, thus tending to restore the trip bar 44, in the absence of any external forces, to a first position which is horizontal when the stake 12 is vertically inserted into the ground. The springs 66 and 68 normally maintain the trip bar 44 horizontally level as the pivot axis of the trip bar 44, defined by the longitudinal axis of the shaft 60, is displaced vertically relative to the alert box 14.

The alert button 46 is positioned on the inside bottom surface of the alert box 14, such that the inside end portion of the trip bar 44 will impinge upon the alert button 46 as the outside portion of the trip bar 44 pivots up. Displacing the pivot axis of the trip bar 44 vertically upward increases the length of the arc that the inside end portion of the trip bar 44 must travel before contacting the alert button 46. Thus displacing the pivot axis of the trip bar 44 vertically upward decreases the sensitivity of the alert box 14 to movements of the trip bar 44.

The vertical displacement of the pivot axis of the trip bar 44 is made possible by rectangular slots 74 and 76, provided on the left and right sides of the alert box 14 respectively, which allow the shaft 60 to be vertically displaced relative to the alert box 14. The first end of the shaft 60 is provided with a square cross section portion 78. The square cross section portion 78 is interposed between the cylindrical portion of the shaft 60 and a head 80. The head 80 has a diameter, measured radially from the longitudinal axis of the shaft 60, which is greater than the width of the slot 74, and acts to retain the square cross section portion 78 within the slot 74. The square cross section portion 78 fits within the slot 74 and acts to keep the shaft 60 from rotating while allowing the first end of the shaft 60 to be slidably displaced within the slot 74.

The second end of the shaft 60 is threaded and passes through the slot 76 to engage the sensitivity adjustment knob 82. The knob 82 has internal threads which engage the threads on the second end of the shaft 60. The annular surface about the opening in the knob 82, which receives the second end of the shaft 60, is wider than the slot 76. By tightening the knob 82, the head 80 and the knob 82 are brought into frictional engagement with the exterior surface of the alert box 14, thus keeping the shaft 60 from moving within the alert box 14. When it is desired to change the sensitivity of the alert box, the knob 82 is first loosened, then the shaft 60 is moved to the desired location, and finally the knob 82 is tightened again to keep the shaft 60 in the desired location.

The slots 74 and 76 are long enough so that when the shaft 60 is moved to the topmost position along the slots 74 and 76, the trip bar 44 can no longer impinge on the alert button 46. The shaft 60 is put in this topmost position when carrying the fishing rod holder 10 to and from the fishing site, in order to avoid inadvertently setting off the alert box 14.

The alert box 14 also includes an internal channel 84 designed to receive the first end of the top piece of the stake 20. Bolts 86 and 88 pass through the walls of the channel 84 and the through holes to secure the alert box 14 to the first end of the top piece of the stake 20.

Figure 5:
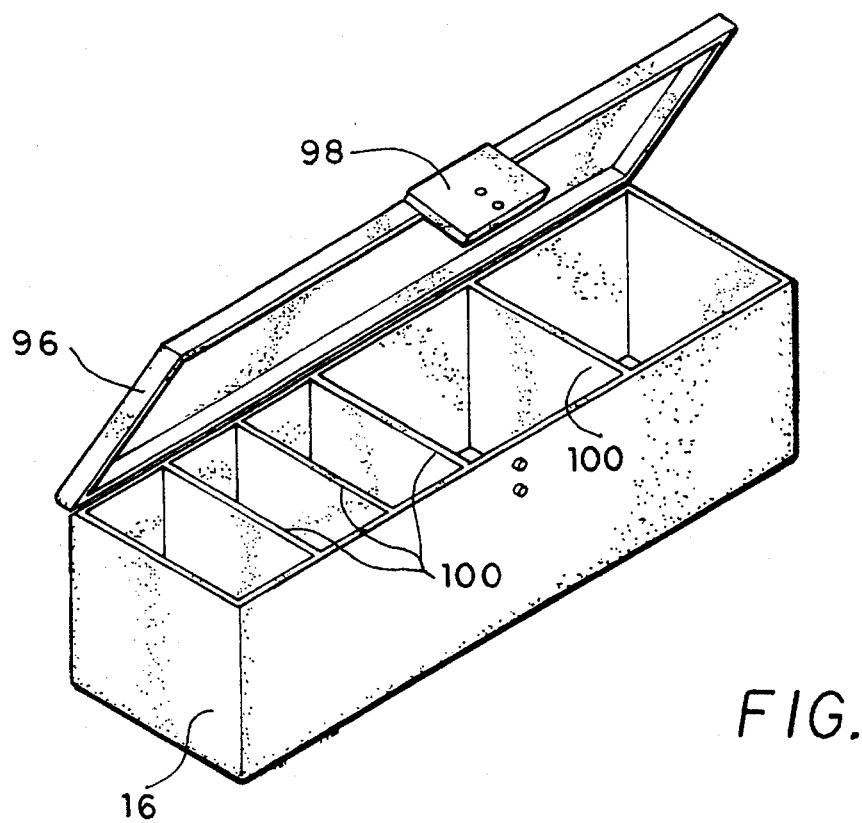
FIG. 5 is a perspective view of the tackle box with the lid open.
Figure 6:
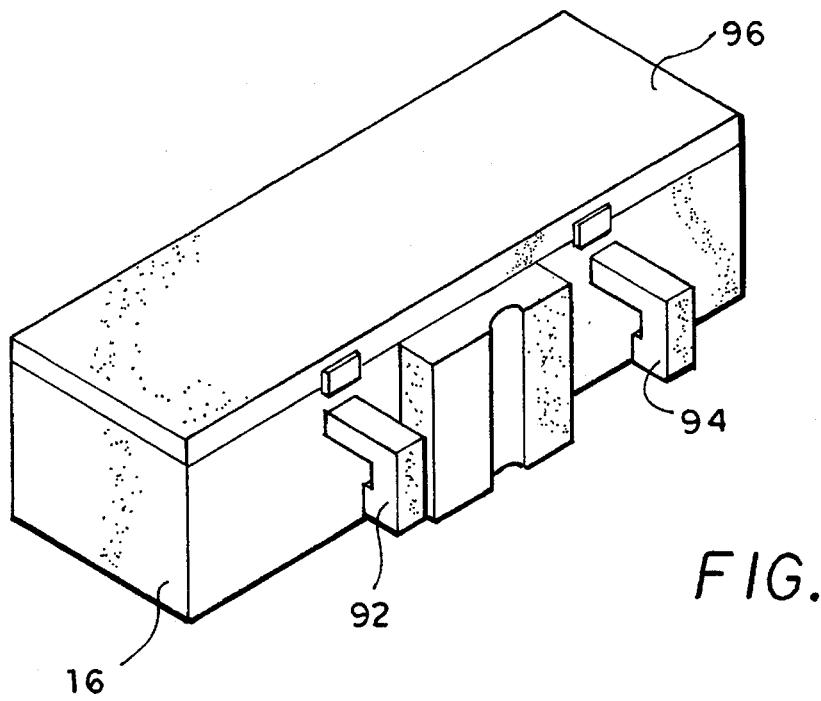
FIG. 6 is a rear perspective view of the tackle box with lid closed.

Referring to FIGS. 5 and 6, a small tackle box 16 can be optionally provided which hooks onto handles 30 and 32 using hooks 92 and 94 respectively. The hooks 92 and 94 are made of a sufficiently resilient material to allow removal of the tackle box from the stake 12, thus allowing easier access to the handles 30 and 32 for driving the stake 12 into the ground. The tackle box 16 has a hinged lid 96 which is provided with a snap 98 which can be used to secure the lid 96 in the closed position. Partitions 100 are provided within the tackle box 16 to keep the various hooks, sinkers, and bobbers organized into separate groups.

In use the stake 12 is collapsed to allow easy carrying of the fishing rod holder 10 to and from the fishing site. A belt clip 102, provided on the side of the alert box 14, allows the fishing rod holder 10 to be carried on the fisherman's belt leaving his hands free to transport other equipment such as fishing rods and bait containers.

Once at the fishing site, the stake 12 is extended and driven into the ground. The stake 12 normally being driven into a portion of ground adjacent a body of water. The knob 82 is loosened and the shaft 60 lowered to a position where the inside end portion of the trip bar 44 can impinge on the alert button 46 if the trip bar 44 is sufficiently pivoted. The calmer the water, the lower the shaft 60 will be positioned, thus reducing the amount that the trip bar 44 has to pivot before impinging on alert button 46, and thereby increasing the sensitivity of the device 10. In rougher water the shaft 60 would be kept in a relatively high position, thus reducing the chance of false alarms due to the rough water.

Once the sensitivity of the device 10 is properly set, the bait is cast into the water in a normal manner. After casting the bait, the rod tip is rested on trip bar 44 between upward projections 54 and 56. Resting the rod tip on the trip bar 44 causes some downward deflection of the outside portion of the trip bar. When a fish first strikes the bait the rod tip is violently jerked downward, causing the outside portion of the trip bar 44 to also deflect downward. After the initial strike, as the fish swims with the bait, the tension on the line becomes less. The potential energy stored in spring 66 causes the trip bar 44 to rebound, with the outside portion pivoting up and the inside portion pivoting down until the inside end portion of the trip bar 44 impinges on alert button 46.

The alert button 46, the battery 48, the music box 50, and the speaker 52 are electrically interconnected. When the trip bar 44 impinges on the alert button 46, the music box 50 is activated and causes a melody or some other audible tone to be emitted from the speaker 52. The battery 48 supplies the necessary power to operate the music box 50. Alerted by the melody or tone, the fisherman can then assume control of the fishing rod and set the hook in the fishes mouth and reel in his catch. As an alternative to, or in addition to, the audible alarm a visual alarm such as a flashing light may also be provided. An access door 104 is preferably provided in the rear of the alert box 14 for battery replacement. Also provided in the rear of the alert box 14, is a protective grille 106 for the speaker 52.

The details of the structure of the music box, alert button, battery, and speaker and the wires connecting them are not shown since such devices and the manner of electrically connecting them are well known.

It is to be understood that the present invention is not limited to the sole embodiment described above, but encompasses any and all embodiments within the scope of the following claims.

I claim:

1. A fishing rod alert device comprising:

a stake for anchoring the fishing rod alert device to the ground, said stake having a top end and a bottom end;

an alert box fixed to said top end of said stake, said alert box having a top, a bottom, a front, a rear, a left side, and a right side;

a trip bar having an outside portion and an inside end portion, said trip bar being arranged to pivot about a shaft located within said alert box, said shaft passing through said trip bar between said outside portion and said inside end portion, and said outside portion being configured to support a fishing rod;

said shaft having a first end and a second end, said first end of said shaft slidably engaging a slot in said left side of said alert box, said second end of said shaft passing through a slot in said right side of said alert box, said slot in said right side of said alert box being aligned with said slot in said left side of said alert box, said second end of said shaft having threads that matingly engage internal threads provided in a knob, and said knob being frictionally engageable with the periphery of said slot in said right side of said alert box, whereby said shaft can be secured at a selected height above said bottom of said alert box; and an alarm signal generator disposed within said alert box and being responsive to pivotal movement of said trip bar, whereby an alarm signal is generated when a fish striking a bait provided at the end of a line connected to a fishing rod supported by said trip bar, causes said trip bar to pivot about said shaft.

2. The fishing rod alert device according to claim 1, wherein said trip bar includes two projections provided on said outside portion of said trip bar, said projections lying in the same plane and being spaced apart, whereby the fishing rod supported by a portion of said trip bar disposed between said projections is prevented from sliding off of said trip bar.

3. The fishing rod alert device according to claim 1, further including two springs, each of said springs extending between said trip bar and the top of said alert box, said springs being symmetrically disposed about said shaft passing through said trip bar, and said springs acting to restore said trip bar to a first position.

4. The fishing rod alert device according to claim 3, wherein a first one of said springs is connected to said trip bar at a location between said outside portion of said trip bar and the location where said shaft passes through said trip bar.

5. The fishing rod alert device according to claim 4, wherein said alarm signal generator includes an activation switch positioned within said alert box so that said inside end of said trip bar will impinge upon said activation switch when said trip bar is caused to swing pivotally by potential energy stored in said first one of said springs.

6. The fishing rod alert device according to claim 5, wherein said activation switch is disposed on said bottom of said alert box.

7. The fishing rod alert device according to claim 6, wherein said stake is collapsible whereby the fishing rod alert device can be more easily transported.

8. The fishing rod alert device according to claim 6, wherein said stake includes at least one handle member to facilitate the driving of said stake into the ground.

9. The fishing rod alert device according to claim 8, further including a tackle box removably attached to said at least one handle member.

10. The fishing rod alert device according to claim 6, wherein said bottom end of said stake is frustoconical with a rounded tip to allow said stake to more easily penetrate the ground.

11. The fishing rod alert device according to claim 1, wherein said outside portion of said trip bar projects from said alert box through a slot in said front of said alert box.

* * * * *